(12) United States Patent
Kawamura et al.

(10) Patent No.: US 10,371,258 B2
(45) Date of Patent: Aug. 6, 2019

(54) CONTROL DEVICE FOR ACTUATOR, ACTUATOR, VALVE DRIVING DEVICE AND CONTROL METHOD FOR ACTUATOR

(71) Applicant: MITSUBISHI ELECTRIC CORPORATION, Tokyo (JP)

(72) Inventors: Satoshi Kawamura, Tokyo (JP); Kenta Hatano, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/550,228

(22) PCT Filed: Apr. 9, 2015

(86) PCT No.: PCT/JP2015/061106
§ 371 (c)(1),
(2) Date: Aug. 10, 2017

(87) PCT Pub. No.: WO2016/163002
PCT Pub. Date: Oct. 13, 2016

(65) Prior Publication Data
US 2018/0041156 A1    Feb. 8, 2018

(51) Int. Cl.
*H02P 21/00* (2016.01)
*H02P 1/18* (2006.01)
(Continued)

(52) U.S. Cl.
CPC ............ *F16H 61/32* (2013.01); *B60L 15/20* (2013.01); *H02K 11/25* (2016.01); *H02K 21/14* (2013.01);
(Continued)

(58) Field of Classification Search
CPC ........ H02P 21/0003; H02P 1/18; H02P 29/64; F16H 61/32
See application file for complete search history.

(56) References Cited

U.S. PATENT DOCUMENTS

| 2008/0036415 | A1* | 2/2008 | Kaizuka | H02P 21/0003 318/730 |
| 2011/0215749 | A1* | 9/2011 | Saruwatari | H02P 1/18 318/453 |
| 2013/0069579 | A1* | 3/2013 | Uematsu | H02P 29/64 318/473 |

(Continued)

FOREIGN PATENT DOCUMENTS

| JP | 4-304194 A | 10/1992 |
| JP | 9-84376 A | 3/1997 |

(Continued)

*Primary Examiner* — Eduardo Colon Santana
*Assistant Examiner* — Cortez M Cook
(74) *Attorney, Agent, or Firm* — Birch, Stewart, Kolasch & Birch, LLP (57) ABSTRACT

A position sensor mounted in an actuator includes a magnetic detecting element for detecting the position of a shaft, and a temperature detecting element for detecting intra-sensor temperature which is used for correction of the temperature characteristics of the magnetic detecting element, the magnetic detecting element and the temperature detecting element being built therein. A control device for the actuator acquires both the temperature-corrected position of the shaft and the intra-sensor temperature from the position sensor, and uses them for control of the actuator.

6 Claims, 5 Drawing Sheets

(51) Int. Cl.
*H02P 29/64* (2016.01)
*F16H 61/32* (2006.01)
*H02K 11/25* (2016.01)
*H02P 29/66* (2016.01)
*B60L 15/20* (2006.01)
*H02K 21/14* (2006.01)
*H02P 29/60* (2016.01)
*H02P 7/02* (2016.01)

(52) U.S. Cl.
CPC .............. *H02P 7/02* (2016.02); *H02P 29/60* (2016.02); *H02P 29/64* (2016.02); *H02P 29/662* (2016.11); *B60L 2240/16* (2013.01); *B60L 2240/36* (2013.01); *B60L 2240/425* (2013.01); *Y02T 10/7258* (2013.01)

(56) References Cited

U.S. PATENT DOCUMENTS

2013/0300336 A1* 11/2013 Ishikawa ................. G03B 5/02
                                                                  318/610
2015/0048772 A1*  2/2015 Nagata ................... H02P 29/64
                                                                  318/634
2015/0303860 A1   10/2015 Imanishi et al.

FOREIGN PATENT DOCUMENTS

| JP | 2007-45325 A | | 2/2007 | |
| JP | 2008-76078 A | | 4/2008 | |
| JP | 2008076078 A | * | 4/2008 | |
| JP | 2013-70485 A | | 4/2013 | |
| JP | WO 2013145267 A1 | * | 10/2013 | ............... G05B 6/02 |
| WO | WO 2014/083963 A1 | | 6/2014 | |

* cited by examiner

CONTROL DEVICE FOR ACTUATOR, ACTUATOR, VALVE DRIVING DEVICE AND CONTROL METHOD FOR ACTUATOR

TECHNICAL FIELD

The present invention relates to a control device for an actuator that uses a direct-current motor as a driving source, an actuator, a valve driving device and a control method for an actuator.

BACKGROUND ART

In a direct-current motor used as a driving source of an actuator, its performance degrades when the temperature of coils thereof rises due to the passage of currents through the coils. For this reason, conventionally, an independent temperature sensor is disposed in the direct-current motor, to detect the temperature (for example, refer to Patent Literature 1), or the coil temperature is estimated on the basis of the currents passing through the coils and the time period during which the currents pass through the coils, to limit the current passing through the direct-current motor on the basis of the temperature, thereby preventing performance degradation.

CITATION LIST

Patent Literature

Patent Literature 1: Japanese Unexamined Patent Application Publication No. 2007-45325

SUMMARY OF INVENTION

Technical Problem

However, a problem is that when the detected value provided by the temperature sensor is used for control of the direct-current motor, an independent temperature sensor is needed independently of the actuator.

Further, another problem is that a coil temperature estimated indirectly is less accurate than a temperature directly detected by the temperature sensor.

The present invention is made in order to solve the above-mentioned problems, and it is therefore an object of the present invention to provide a technique for acquiring the internal temperature of an actuator which is more accurate than temperature estimated indirectly, without disposing a temperature sensor independently of the actuator.

Solution to Problem

A control device for an actuator according to the present invention includes: an acquirer to acquire both the position of a shaft which is temperature-corrected by using intra-sensor temperature detected by a temperature detecting element built in a position sensor, and the intra-sensor temperature; and a controller to control the actuator by using both the temperature-corrected position of the shaft and the intra-sensor temperature which are acquired by the acquirer.

Advantageous Effects of Invention

According to the present invention, because the intra-sensor temperature detected by the temperature detecting element built in the position sensor is acquired, the internal temperature of the actuator which is more accurate than the temperature estimated indirectly can be acquired, without mounting a temperature sensor independently of the actuator.

DESCRIPTION OF EMBODIMENTS

Hereafter, in order to explain this invention in greater detail, embodiments of the present invention will be described with reference to accompanying drawings.

Embodiment 1.

A case of using an actuator according to the present invention as a wastegate (hereinafter referred to as WG) actuator that drives a WG valve of a turbocharger that is mounted in a vehicle will be explained as an example.

Figure 1:
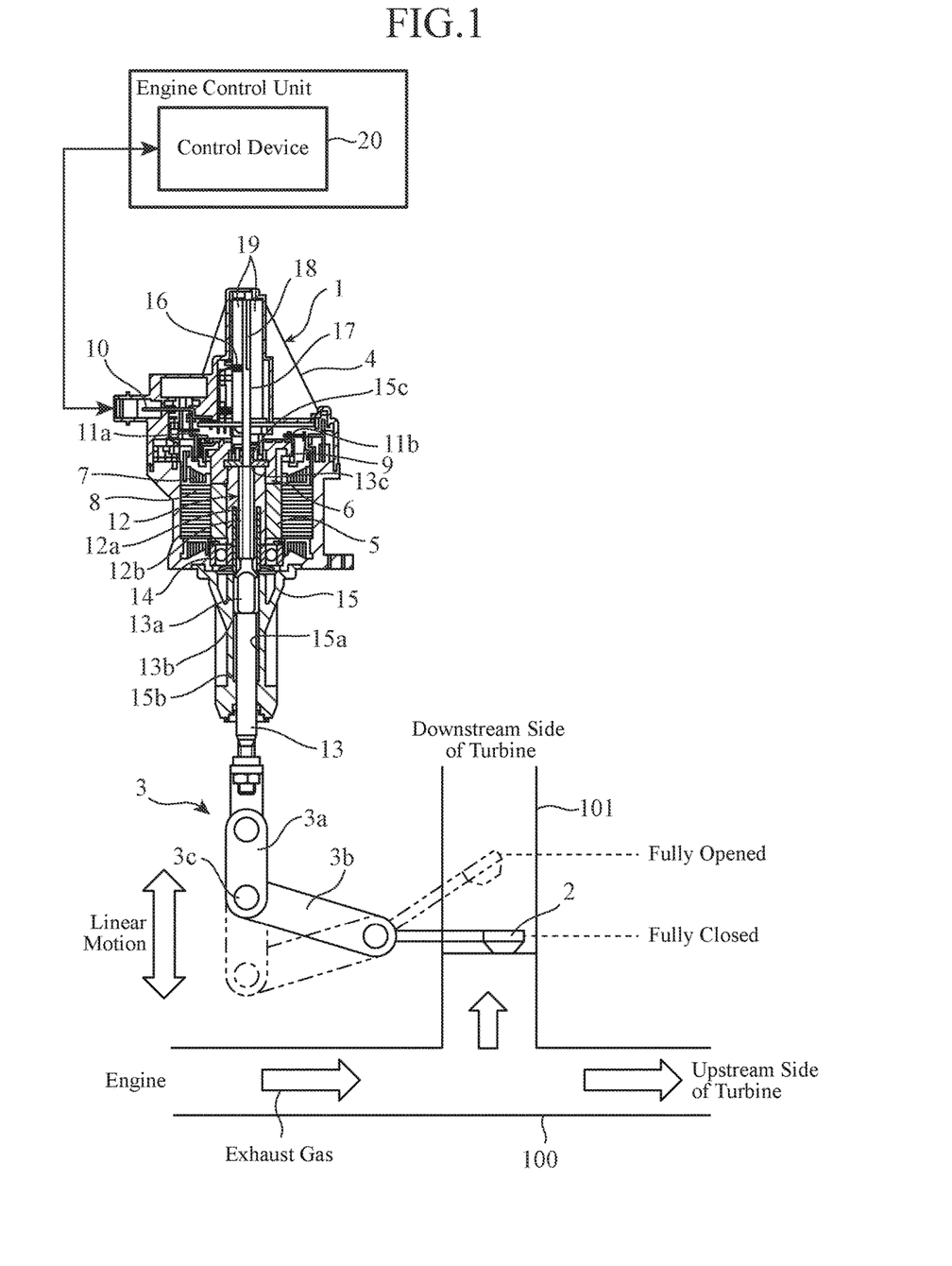
FIG. 1 is a cross-sectional view showing an example of the configuration of a wastegate actuator according to Embodiment 1 of the present invention.

FIG. 1 is a cross-sectional view showing an example of the configuration of a WG actuator 1 according to Embodiment 1. The turbocharger is configured so as to rotate a turbine by using an exhaust gas from an engine, drive a compressor connected with this turbine on the same axis, compress intake air, and supply this compressed intake air to the engine. A WG valve 2 for bypassing the exhaust gas from an exhaust passage 100 to a bypass passage 101 is disposed on an upstream side of the exhaust passage 100 with respect to the turbine. The number of rotations of the turbine is controlled by opening or closing the WG valve 2 to adjust the inflow of the exhaust gas from the exhaust passage 100 to the bypass passage 101 by means of the WG actuator 1. In FIG. 1, a solid line shows a fully closed state of the WG valve 2, and a chain double-dashed line shows a fully opened state of the WG valve 2.

The WG actuator 1 includes a direct-current motor 4 that serves as a driving source, a shaft 13 that opens and closes the WG valve 2, and a screw mechanism 12 that converts a rotary motion of the direct-current motor 4 into a linear motion of the shaft 13. The direct-current motor 4 includes a rotor 6 having a magnet 5 magnetized into a plurality of N and S poles, and a stator 8 on which coils 7 are wound. Brushes 11b are connected with ends of the coils 7. The rotor 6 is rotatably supported by a bearing portion 14 on one end side thereof, and a commutator 9 is fixed on the other end side of the rotor 6.

When a voltage is applied to an external terminal 10, currents flow through commutator bars in contact with brushes 11a, among plural commutator bars which configure the commutator 9, via the brushes 11a connected with this external terminal 10, and currents flow through the coils 7 via the brushes 11*b* electrically connected with these commutator bars. The stator 8 is magnetized into an N pole and an S pole by the passage of the currents through the coils 7, and the N pole and the S pole of the stator 8 repel and attract the N pole and the S pole of the magnet 5 and this causes the rotor 6 to rotate. As the rotor 6 rotates, the coils 7 through which the currents are made to pass are switched and, as a result, the poles of the stator 8 are also switched and the rotor 6 continues rotating. When the directions of the currents are reversed, the direction of rotation of the rotor 6 is also reversed.

Although a DC motor with brushes is used as the direct-current motor 4 in the example shown in FIG. 1, a brushless DC motor may be used.

A hole used for disposing the shaft 13 is made inside the rotor 6, and a female screw portion 12*a* is formed on an inner circumferential surface of the hole and a male screw portion 12*b* is formed on an outer circumferential surface of the shaft 13. This male screw portion 12*b* is screwed into and coupled with the female screw portion 12*a*, and a rotary motion of the rotor 6 is converted into a linear motion of the shaft 13. The screw mechanism 12 consists of these female screw portion 12*a* and male screw portion 12*b*. One end of the shaft 13 penetrates the housing 15, and is joined to the WG valve 2 via a linkage mechanism 3. A position sensor 16 for detecting the position of this shaft 13 in an axial direction, and so on are disposed on the other end side of the shaft 13.

The linkage mechanism 3 has two plates 3*a* and 3*b*. The shaft 13 is attached on one end side of the plate 3*a*, and one end of the plate 3*b* is attached rotatably to a supporting point 3*c* disposed on the other end side of the plate 3*a*. The WG valve 2 is attached on the other end side of this plate 3*b*. When the shaft 13 moves in a direction in which the shaft 13 is pushed out from the housing 15 in response to a rotation in one direction of the rotor 6, the plate 3*a* also moves in the same direction, the plate 3*b* and the WG valve 2 rotate around the supporting point 3*c*, and the WG valve 2 moves in a valve opening direction. When the shaft 13 moves in a direction in which the shaft is retracted into the housing 15 in response to a rotation in a reverse direction of the rotor 6, the plate 3*a* also moves in the same direction, and the plate 3*b* and the WG valve 2 rotate around the supporting point 3*c*, and the WG valve 2 moves in a valve closing direction.

Two flat surfaces or the likes are formed on the shaft 13, and function as a rotation limiting portion 13*a*. Further, on an inner circumferential surface of a hole of the housing 15 which the shaft 13 penetrates, a guide portion 15*a*, such as two flat surfaces, is formed in such away as to match the shape of the rotation limiting portion 13*a*. Sliding between the rotation limiting portion 13*a* and the guide portion 15*a* prevents the shaft 13 from rotating in synchronization with a rotation of the rotor 6, to support the shaft 13 in such away as to cause the shaft to make the linear motion. A stopper 15*b* projecting toward the shaft 13 is formed at an end of the guide portion 15*a*. By causing a butting portion 13*b* which is shaped so as to project from the shaft 13 to come into contact with this stopper 15*b*, the shaft 13 is prevented from further making the linear motion in the valve opening direction. Similarly, a plate that functions as a stopper 15*c* is disposed at an end of the screw mechanism 12. By causing an end surface of the shaft 13 that functions as a butting portion 13*c* to come into contact with the stopper 15*c*, the shaft 13 is prevented from further moving in the valve closing direction.

Figure 2:
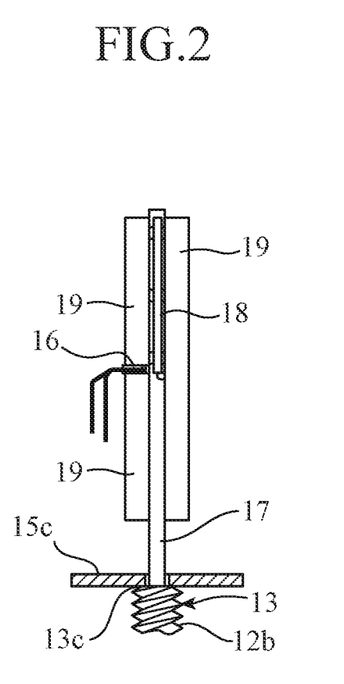
FIG. 2 is a side view showing an example of the configuration of a position sensor according to Embodiment 1.

FIG. 2 is a side view showing an example of the configuration of the position sensor 16 according to Embodiment 1.

In the plate that functions as the stopper 15*c* for the shaft 13, a hole having a diameter smaller than the outer diameter of the shaft 13 penetrates, and a shaft for sensor 17 is made to pass through this hole, and an end surface of the shaft for sensor 17 is in contact with the end surface of the shaft 13. As a result, the shaft for sensor 17 also reciprocates in synchronization with a reciprocating motion in the axial direction of the shaft 13. A magnetic flux of a magnet for sensor 18 flows through a stator for sensor 19 mounted around the magnet for sensor, and passes through the position sensor 16. This magnet for sensor 18 is fixed to the shaft for sensor 17, and, when the position of the magnet for sensor 18 with respect to the position sensor 16 varies due to the reciprocating motion of the shaft 13, a flux density passing through the position sensor 16 also changes.

Figure 3:
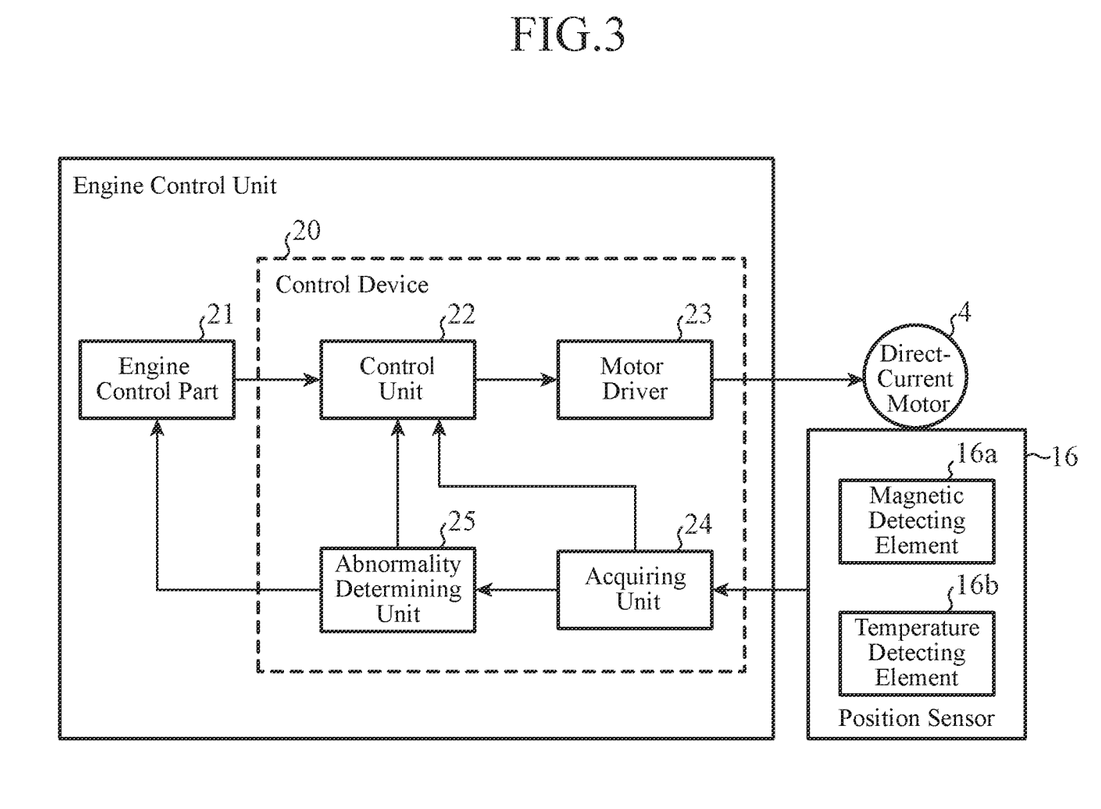
FIG. 3 is a block diagram showing an example of the configuration of a control device for the wastegate actuator according to Embodiment 1.

FIG. 3 is a block diagram showing an example of the configuration of a control device 20.

A magnetic detecting element 16*a* and a temperature detecting element 16*b* are built in the position sensor 16. The magnetic detecting element 16*a* is a Hall element, a magnetoresistive element or the like, and the temperature detecting element 16*b* is a thermistor or the like. The magnetic detecting element 16*a* detects the flux density which varies due to the reciprocating motion of the shaft 13, and converts the flux density into an actual stroke position of the shaft 13. Because the magnetic detecting element 16*a* has characteristics that its magnetic sensitivity depends on temperature, the position sensor 16 detects an intra-sensor temperature by using the temperature detecting element 16*b*, to correct the temperature characteristics of the magnetic detecting element 16*a*. This position sensor 16 outputs a digital signal showing the actual stroke position after the correction of the temperature characteristics, and a digital signal showing the intra-sensor temperature used for the correction to the control device 20 by using, for example, a SENT (Single Edge Nibble Transmission) method. The outputs from the position sensor 16 to the control device 20 are not limited to the digital signals such as digital signals based on the SENT method, but analog signals may be used.

An engine control unit includes an engine control part 21 and the control device 20, and illustration and explanation of components other than these components will be omitted. The engine control part 21 outputs a target stroke position of the shaft 13 to a control unit 22.

Although in the example shown in FIG. 3 the functions of the control device 20 are configured so as to be implemented as one function of the engine control unit, the control device 20 may be configured as an independent electronic control unit or may be incorporated, as a circuit board, into the WG actuator 1.

The control device 20 includes the control unit 22, a motor driver 23, an acquiring unit 24 and an abnormality determining unit 25.

The acquiring unit 24 acquires the digital signal showing the actual stroke position of the shaft 13 and the digital signal showing the intra-sensor temperature from the position sensor 16. The acquiring unit 24 outputs the actual stroke position acquired thereby to the control unit 22, and outputs the intra-sensor temperature to the abnormality determining unit 25. The actual stroke position which the acquiring unit 24 has acquired from the position sensor 16 is the position which has been temperature-corrected by the position sensor 16.

The control device 20 according to Embodiment 1 estimates that the intra-sensor temperature detected by the temperature detecting element 16b is equal to the internal temperature of the WG actuator 1, and determines an abnormality in the temperature of the WG actuator 1 on the basis of this intra-sensor temperature, as explained below.

The abnormality determining unit 25 compares the intra-sensor temperature received from the acquiring unit 24 with a predetermined temperature threshold. The abnormality determining unit 25 determines that the WG actuator 1 has an abnormal temperature when the intra-sensor temperature is higher than the temperature threshold, whereas the abnormality determining unit determines that the WG actuator 1 has a normal temperature when the intra-sensor temperature is equal to or lower than the temperature threshold, and outputs the result of the determination to the control unit 22. The temperature threshold is an upper limit (e.g., 100 degrees) on a temperature range within which the WG actuator 1 operates normally. For example, the temperature threshold is the temperature below which a situation in which the internal temperature of the WG actuator 1 rises due to either the passage of a current through the direct-current motor 4 or the operating environment temperature, and, as a result, it becomes impossible to maintain the performance needed for the WG actuator 1 or the WG actuator is subjected to melt damage can be prevented from occurring. Further, a hysteresis can be provided for the temperature threshold, and it is determined as an abnormal temperature when the intra-sensor temperature is higher than an upper limit (e.g., 100 degrees) on the temperature threshold, whereas it can be determined as a normal temperature when the intra-sensor temperature is lower than a lower limit (e.g., 50 degrees) on the temperature threshold.

The control unit 22 receives a notification of the result of the determination showing the abnormal temperature or the normal temperature from the abnormality determining unit 25.

When the result of the determination showing the normal temperature is notified from the abnormality determining unit 25, the control unit 22 performs feedback control on the stroke position of the shaft 13 in such a way that the actual stroke position received from the acquiring unit 24 gets close to the target stroke position received from the engine control part 21. By performing the feedback control on the stroke position of the shaft 13, the degree of opening of the WG valve 2 joined to the shaft 13 is adjusted. For example, when performing PID control, the control unit 22 calculates the difference between the target stroke position and the actual stroke position, calculates amounts of operation which are a proportional term, an integral term and a differential term, these terms corresponding to the difference, to calculate a drive duty, generates a PWM (Pulse Width Modulation) control signal corresponding to the drive duty, and outputs the PWM control signal to the motor driver 23.

When the result of the determination showing the abnormal temperature is notified from the abnormality determining unit 25, the control unit 22 generates a PWM control signal to limit the passage of the current through the direct-current motor 4, and outputs the PWM control signal to the motor driver 23. As a temperature protecting control operation of limiting the passage of the current through the direct-current motor 4, for example, an operation of limiting the drive duty acquired through the above-mentioned feedback control to duty lower than the drive duty, thereby decreasing the passing current, or an operation of limiting the drive duty to zero, thereby stopping the current passage is performed. Through this temperature protecting control operation, an excessive temperature rise in the WG actuator 1 is prevented, and degradation in the performance of the WG actuator 1 is prevented and melt damage or the like is prevented.

The engine control part 21 can be configured so as to receive a notification of the result of the determination showing the abnormal temperature from the usual state determining unit 25, and output an instruction to limit the passage of the current through the direct-current motor 4 to the control unit 22. In the case of this configuration, the control unit 22 limits the drive duty acquired through the feedback control to the duty lower than the drive duty in accordance with the instruction received from the engine control part 21, thereby decreasing the passing current, or limits the drive duty to zero, thereby stopping the current passage, like in the case of the above-mentioned configuration.

The motor driver 23 performs on/off control on a voltage applied to the direct-current motor 4 in accordance with the PWM control signal which the motor driver receives from the control unit 22, to adjust the current passing through the direct-current motor 4.

Figure 4:
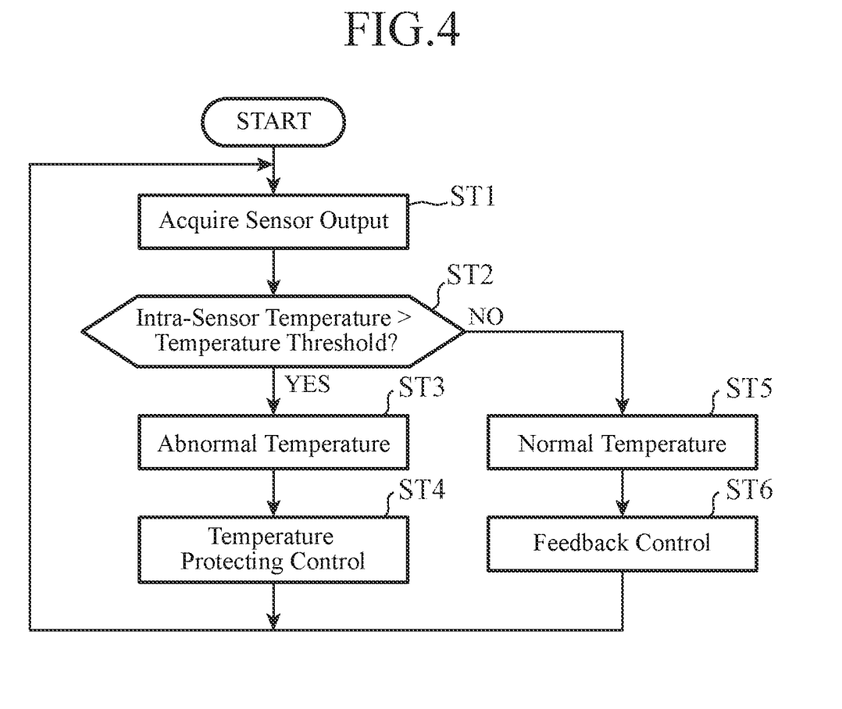
FIG. 4 is a flow chart showing an operation which is performed by the control device for the wastegate actuator according to Embodiment 1.

FIG. 4 is a flow chart showing the operation of the control device 20.

The acquiring unit 24 acquires both the actual stroke position of the shaft 13 and the intra-sensor temperature from the position sensor 16 (step ST1). The abnormality determining unit 25 compares the intra-sensor temperature detected by the temperature detecting element 16b with the predetermined temperature threshold (step ST2), and, when the intra-sensor temperature is higher than the temperature threshold ("YES" in step ST2), determines that the WG actuator 1 has an abnormal temperature and notifies the control unit 22 of this determination result (step ST3). The control unit 22 which has received this notification performs the temperature protecting control in such a way as to limit the passage of the current through the direct-current motor 4 (step ST4).

In contrast, when the intra-sensor temperature is equal to or lower than the temperature threshold ("NO" in step ST2), the abnormality determining unit 25 determines that the WG actuator 1 has a normal temperature, and notifies the control unit 22 of this determination result (step ST5). The control unit 22 which has received this notification performs the normal feedback control (step ST6).

Figure 5:
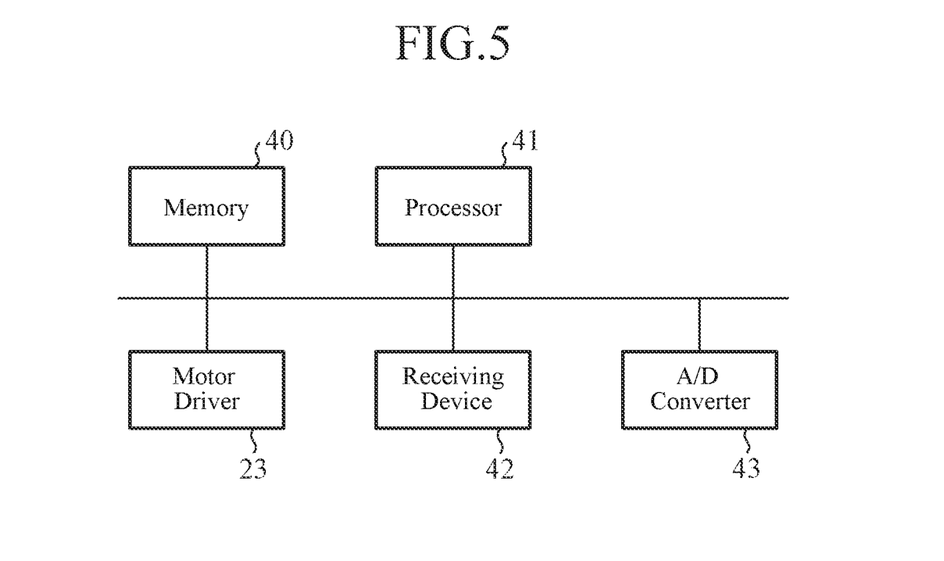
FIG. 5 is a diagram showing an example of the hardware configuration of the control device for the wastegate actuator according to Embodiment 1.

Next, an example of the hardware configuration of the control device 20 will be explained using FIG. 5.

The motor driver 23 is comprised of a switching element or the like that switches on and off the voltage applied to the direct-current motor 4. In a case in which the position sensor 16 is of a type that outputs digital signals based on the SENT method, the acquiring unit 24 is a receiving device 42 that receives digital signals. In a case in which the position sensor 16 is of a type that outputs analog signals, the acquiring unit 24 is an A/D converter 43. The control device 20 should just include either the receiving device 42 or the A/D converter 43 in accordance with the type of the outputs of the position sensor 16.

The control unit 22 and the abnormality determining unit 25 are implemented by a processor 41 that executes a program stored in a memory 40. The processor 41 is a processing circuit such as a CPU or a system LSI. The memory 40 stores the temperature threshold used for determining whether the internal temperature of the WG actuator 1 is abnormal or normal, and so on, in addition to the above-mentioned program. Plural processors and plural memories can perform the above-mentioned functions in cooperation with one another.

As mentioned above, according to Embodiment 1, because the control device 20 is configured so as to include the acquiring unit 24 that acquires both the position of the shaft which has been temperature-corrected by using the intra-sensor temperature detected by the temperature detecting element 16b built in the position sensor 16, and the intra-sensor temperature, and the control unit 22 that controls the WG actuator 1 by using both the position of the shaft 13 and the intra-sensor temperature which the acquiring unit 24 has acquired, the control device can acquire the internal temperature of the actuator which is more accurate than temperature estimated indirectly, without mounting a temperature sensor independently of the actuator. In addition, the actuator can be controlled with a high degree of accuracy by using the highly-accurate internal temperature.

Further, according to Embodiment 1, because the abnormality determining unit 25 determines that the internal temperature of the WG actuator 1 is abnormal when the intra-sensor temperature acquired by the acquiring unit 24 is higher than the temperature threshold, the temperature protecting control on the actuator can be performed with a high degree of accuracy.

Embodiment 2.

Figure 6:
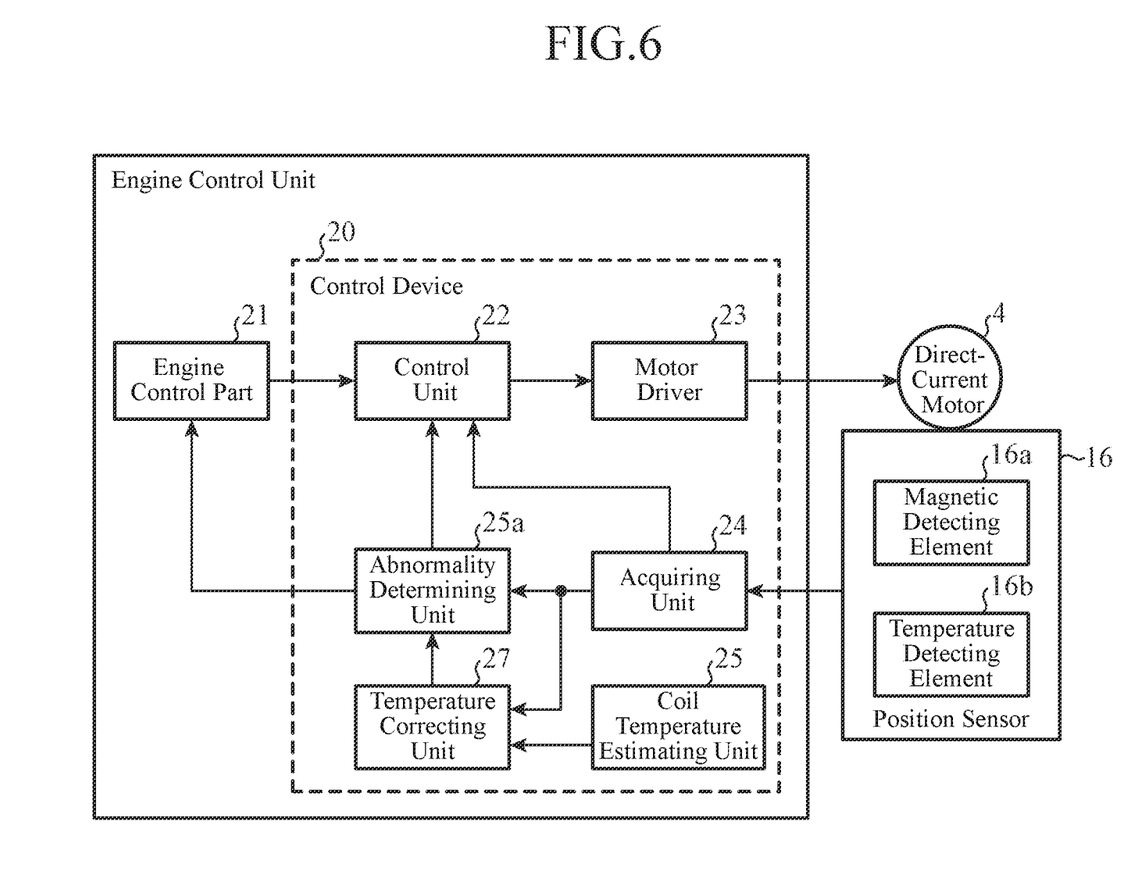
FIG. 6 is a block diagram showing an example of the configuration of a control device for a wastegate actuator according to Embodiment 2 of the present invention.

FIG. 6 is a block diagram showing an example of the configuration of a control device 20 for a WG actuator 1 according to Embodiment 2 of the present invention. In FIG. 6, the same components as those shown in FIG. 3 or like components are designated by the same reference numerals, and the explanation of the components will be omitted hereafter. Because the WG actuator 1 which is an object to be controlled by the control device 20 according to Embodiment 2 has the same configuration as that according to above-mentioned Embodiment 1, the WG actuator will be explained using FIGS. 1 and 2.

The control device 20 according to Embodiment 2 includes a coil temperature estimating unit 26 that estimates the temperature of the coil 7 of a direct-current motor 4. Hereafter, the temperature of the coil 7 of the direct-current motor 4 is referred to as the "coil temperature." As a method of estimating the coil temperature, a well-known method, for example, a method of detecting the value of a current passing from a motor driver 23 to the coil 7 of the direct-current motor 4, and a time period during which the current passes through the coil 7, to estimate the coil temperature. The coil temperature estimating unit 26 outputs the estimated coil temperature to a temperature correcting unit 27.

However, because the coil temperature estimating unit 26 estimates the coil temperature indirectly without using any measured temperature, the coil temperature is not highly accurate. Therefore, there is a possibility that the difference between the estimated coil temperature and the WG actuator 1 is too large in terms of practical use. Thus, in Embodiment 2, the coil temperature estimated by the coil temperature estimating unit 26 is corrected by using intra-sensor temperature detected by a temperature detecting element 16b built in a position sensor 16, and the accuracy of the estimation is increased. Concretely, the temperature correcting unit 27 estimates the internal temperature of the WG actuator 1 by using both the intra-sensor temperature received from an acquiring unit 24 and the coil temperature received from the coil temperature estimating unit 26, and outputs the internal temperature to an abnormality determining unit 25a. The temperature correcting unit 27 calculates, for example, a simple average or a weighted average of the intra-sensor temperature and the coil temperature, and estimates the calculated average to be the internal temperature of the WG actuator 1.

The abnormality determining unit 25a compares the internal temperature of the WG actuator 1 received from the temperature correcting unit 27 with a temperature threshold, to determine whether the WG actuator 1 has a normal temperature or abnormal temperature.

As mentioned above, according to Embodiment 2, because the control device 20 is configured so as to include the coil temperature estimating unit 26 that estimates the temperature of the coil 7 of the direct-current motor 4, and the temperature correcting unit 27 that corrects the temperature of the coil 7 estimated by the coil temperature estimating unit 26 by using the intra-sensor temperature acquired by the acquiring unit 24, the control device can improve the accuracy of the estimation greatly compared with the case in which the coil temperature is estimated indirectly.

Next, a variant of the control device 20 according to Embodiment 2 will be explained.

As mentioned above, because the accuracy of the estimation of the coil temperature by the coil temperature estimating unit 26 is not high, even if the coil temperature is corrected using the intra-sensor temperature detected by the temperature detecting element 16b, the corrected coil temperature is not necessarily equal to the actual internal temperature of the WG actuator 1. Thus, in this modified example, when the intra-sensor temperature detected by the temperature detecting element 16b is higher than a temperature threshold, it is determined that the WG actuator 1 has an abnormal temperature even though the internal temperature of the WG actuator 1 received from the temperature correcting unit 27 is equal to or lower than its temperature threshold and indicates a normal temperature.

Concretely, the intra-sensor temperature is outputted from the acquiring unit 24 directly to the abnormality determining unit 25a. The abnormality determining unit 25a compares the intra-sensor temperature received from the acquiring unit 24 with the temperature threshold, first, to determine whether the WG actuator 1 has a normal temperature or abnormal temperature. When, in this determining process, determining that the WG actuator 1 has an abnormal temperature, the abnormality determining unit 25a notifies a control unit 22 of the result of the determination showing the abnormal temperature. In contrast, when determining that the WG actuator 1 has a normal temperature, the abnormality determining unit 25a then compares the internal temperature of the WG actuator 1 which the abnormality determining unit has received from the temperature correcting unit 27 with the temperature threshold, and determines whether the WG actuator 1 has a normal temperature or abnormal temperature. When, in this determining process, determining that the WG actuator 1 has an abnormal temperature, the abnormality determining unit 25a notifies the control unit 22 of the result of the determination showing the abnormal temperature.

As mentioned above, because when the intra-sensor temperature which the acquiring unit 24 has acquired is higher than the temperature threshold, the abnormality determining unit 25a determines that the internal temperature of the WG actuator 1 is abnormal, without using the estimated coil temperature, the abnormality determining unit can determine an abnormality in the temperature of the WG actuator 1 more certainly.

It is to be understood that any combination of the above-mentioned embodiments can be freely made, various changes can be made in any component according to any one of the above-mentioned embodiments, and any component according to any one of the above-mentioned embodiments can be omitted within the scope of the invention.

Although in the above-mentioned explanation the WG valve is mentioned as an example of the object to be driven which is driven by the actuator according to the present invention, the present invention is not limited to this example. An exhaust gas recirculation (EGR) valve mounted in the engine, a movable vane mounted in a variable geometry (VG) turbocharger, or the like can be the object to be driven.

Further, although the configuration of joining the shaft of the actuator according to the present invention and the object to be driven by using the linkage mechanism is shown, a configuration of directly joining the shaft and the object to be driven without using the linkage mechanism may be provided.

Further, a valve driving device including the actuator according to the present invention, the valve which is the object to be driven, and the control device may be configured.

Although in the above-mentioned explanation the example of using the intra-sensor temperature detected by the position sensor for the temperature protecting control on the actuator is explained, this embodiment is not limited to this use.

INDUSTRIAL APPLICABILITY

Because the control device for the actuator according to the present invention acquires the highly-accurate internal temperature of the actuator, the control device is suitable for use as a control device for an actuator that uses a direct-current motor as a driving source.

REFERENCE SIGNS LIST

1 WG actuator, 2 WG valve (object to be driven), 3 linkage mechanism, 3a, 3b plate, 3c supporting point, 4 direct-current motor, 5 magnet, 6 rotor, 7 coil, 8 stator, 9 commutator, 10 external terminal, 11a, 11b brush, 12 screw mechanism, 12a female screw portion, 12b male screw portion, 13 shaft, 13a rotation limiting portion, 13b, 13c butting portion, 14 bearing portion, 15 housing, 15a guide portion, 15b, 15c stopper, 16 position sensor, 16a magnetic detecting element, 16b temperature detecting element, 17 shaft for sensor, 18 magnet for sensor, 19 stator for sensor, 20 control device, 21 engine control part, 22 control unit, 23 motor driver, 24 acquiring unit, 25, 25a abnormality determining unit, 26 coil temperature estimating unit, 27 temperature correcting unit, 40 memory, 41 processor, 42 receiving device, 43 A/D converter, 100 exhaust passage, and 101 bypass passage.

The invention claimed is:

1. A control device for an actuator, the actuator including a shaft, a direct-current motor for causing the shaft to reciprocate in an axial direction, and a position sensor for detecting a position of the shaft, the control device comprising:

an acquirer to acquire both the position of the shaft and an intra-sensor temperature, wherein the position of the shaft is temperature-corrected by using intra-sensor temperature detected by a temperature detecting element built in the position sensor and by correcting, on a basis of the intra-sensor temperature, a temperature characteristic of a magnetic detecting element that is built in the position sensor, detects flux density which varies due to a reciprocating motion of the shaft and converts the flux density into the position of the shaft; and a controller to control the actuator by using both the temperature-corrected position of the shaft and the intra-sensor temperature which are acquired by the acquirer.

2. The control device for the actuator according to claim 1, further comprising a coil temperature estimator to estimate a temperature of a coil of the direct-current motor, and a temperature corrector to correct the temperature of the coil estimated by the coil temperature estimator by using the intra-sensor temperature acquired by the acquirer, and wherein the controller controls the actuator by using both the temperature-corrected position of the shaft acquired by the acquirer, and the temperature corrected by the temperature corrector.

3. The control device for the actuator according to claim 1, further comprising an abnormality determiner to determine that internal temperature of the actuator is abnormal when the intra-sensor temperature acquired by the acquirer is higher than a temperature threshold.

4. An actuator comprising:
a shaft;
a direct-current motor for causing the shaft to reciprocate in an axial direction;
a position sensor for detecting a position of the shaft; and
the control device according to claim 1.

5. A valve driving device comprising:
an actuator including a shaft, a direct-current motor for causing the shaft to reciprocate in an axial direction, and a position sensor for detecting a position of the shaft;
a valve that is driven by the actuator; and
the control device according to claim 1.

6. A control method for an actuator, the control method comprising:

in a control device for an actuator, the actuator including a shaft, a direct-current motor for causing the shaft to reciprocate in an axial direction, and a position sensor for detecting a position of the shaft, acquiring both the position of the shaft and an intra-sensor temperature, wherein the position of the shaft is temperature-corrected by using intra-sensor temperature detected by a temperature detecting element built in the position sensor and by correcting, on a basis of the intra-sensor temperature, a temperature characteristic of a magnetic detecting element that is built in the position sensor, detects flux density which varies due to a reciprocating motion of the shaft and converts the flux density into the position of the shaft, and controlling the actuator by using both the temperature-corrected position of the shaft and the intra-sensor temperature which are acquired.

* * * * *